United States Patent [19]

Haramaki et al.

[11] Patent Number: 4,645,119

[45] Date of Patent: Feb. 24, 1987

[54] METHOD OF BRAZING AN ALUMINUM HEAT EXCHANGER

[75] Inventors: Takashi Haramaki; Katsuhiko Shiota, both of Toukai; Satoshi Kokura, Hitachiohta; Takao Funamoto, Hitachi; Akira Tomita, Mito, all of Japan

[73] Assignee: Hitachi, Ltd., Tokyo, Japan

[21] Appl. No.: 627,892

[22] Filed: Jul. 5, 1984

[30] Foreign Application Priority Data

Jul. 6, 1983 [JP] Japan .................................. 58-122654

[51] Int. Cl.⁴ ............................................ B23K 35/34
[52] U.S. Cl. ....................................... 228/183; 148/24; 228/207; 228/219; 228/263.17
[58] Field of Search ............... 228/207, 223, 263.17, 228/183, 219; 148/24, 26

[56] References Cited

U.S. PATENT DOCUMENTS

| | | | |
|---|---|---|---|
| 2,299,164 | 10/1942 | Miller | 148/26 |
| 3,301,688 | 1/1967 | Simpelaar | 148/26 X |
| 3,855,682 | 12/1974 | Chartet | 228/223 X |
| 3,951,328 | 4/1976 | Wallace et al. | 148/26 X |

FOREIGN PATENT DOCUMENTS

| | | | |
|---|---|---|---|
| 160869 | 12/1981 | Japan | 228/263.17 |
| 22868 | 2/1982 | Japan | 228/263.17 |
| 103958 | 6/1983 | Japan | 228/263.17 |

Primary Examiner—Kenneth J. Ramsey
Attorney, Agent, or Firm—Antonelli, Terry & Wands

[57] ABSTRACT

A heat exchanger and a method of manufacturing a heat exchanger by brazing metal members mainly made of Al or Al alloy is disclosed. The heat exchanger has a plurality of brazed metal members, at least one of the brazed metal members being made of brazing sheet clad with a brazing material. The brazed portions of the metal members or the whole surface of the heat exchanger are coated with a corrosion-resistant fluoride flux consisting essentially of 25–40% KF, 38–54% AlF3 and 3–30% ZnF2 by weight which forms a corrosion-inhibiting metallic film.

8 Claims, 9 Drawing Figures

METHOD OF BRAZING AN ALUMINUM HEAT EXCHANGER

BACKGROUND OF THE INVENTION

This invention relates to a heat exchanger and a method of manufacturing the heat exchanger which is a high thermal efficiency and a high boring corrosion resistance, and more particularly to a heat exchanger manufactured by brazing aluminum or aluminum alloy heat exchanger members to each other with a corrosion-resistant flux.

Heat exchangers are used in, for example, domestic air conditioners, refrigerators, and automobile air conditioners, and utilize a fluid flowing as a cooling medium or a heat medium through a metal passage provided with a large fluid-contact area. When the fluid-contact area of a metal passage is increased, the shape of the metal material forming the passage inevitably becomes complicated. In a heat exchanger consisting of tubes and fins which are provided to increase the fluid-contact area of the fluid passages, the tube are set in holes and grooves formed in the fins. The tubes are then expanded by mechanical force to attach the tubes and fins to each other. The tubes fitted firmly into the fins are connected together by attaching U-shaped tubes, which have been molded in advance, to end portions of the tubes. Flux consisting of a chloride is used for brazing the joints between the tubes fitted into the fins and the U-shaped tubes.

A heat exchanger consisting of fins and tubes is manufactured in this manner, i.e. in two connection steps. In the first step, the fins and tubes are joined together mechanically, and in the second step these tubes and U-shaped tube are brazed together. When viewed microscopically, the mechanical connections between the fins and tubes is a contact between the oxide films formed on the materials thereof. This reduces the rate of transfer of heat between the fins and tubes.

Gaps tend to occur between the mechanically-connected portion of the fins and tubes because of vibrations generated while the heat exchanger is being transported and the heat cycle it is subjected to after it has been manufactured. This also results in a large reduction in the heat transfer rate of the fins and tubes. During the manufacture of a corrugated heat exchanger which must have a high corrosion-resistance, flux to which $ZnCl_2$ is added is used. Since a corrugated heat exchanger has fins of complicated shape, it must be subjected to many steps, such as a cleaning step and an acid-washing step after the brazing step. Moreover, the residual $ZnCl_2$ cannot be removed completely.

A method of brazing aluminum using a corrosion-resistant flux of a fluoride which is used to eliminate these problems, i.e. a flux consisting of a compound of $K_3AlF_6$ and $KAlF_4$ and which is obtained by melting and mixing together KF and $AlF_3$, is proposed by U.S. Pat. No. 3,951,328. This corrosion-resistant fluoride flux has a low hygroscopicity, and, therefore, it is unnecessary to remove the flux remaining on the joint surfaces of the heat exchanger after the brazing step. Although the residual flux has no corrosive components, there is still room for improvement in the boring corrosion resistance of such a heat exchanger.

SUMMARY OF THE INVENTION

An object of the present invention is to provide a heat exchanger which has a high heat conductivity and a high boring corrosion resistance, and simplify the manufacturing steps thereof.

The inventors of the present invention has discovered that, when corrosion-resistant flux containing a metal component which can form a corrosion-inhibiting metal film is used to braze fins and tubes together, at least one of which consists of brazing sheets clad with a brazing material, a heat exchanger with an extremely high thermal efficiency and boring corrosion resistance can be obtained.

A heat exchanger according to the present invention has been made in practice on the basis of this discovery. This heat exchanger is made of a plurality of brazed metal members, at least part of which are composed of brazing sheets clad with a brazing material, the brazed portion of the metal members or the whole surface of the heat exchanger being coated with a corrosion-resistant fluoride flux which can form a corrosion-inhibiting metallic film.

According to the present invention, the metal members constituting the heat exchanger, i.e. the fins and tubes, are mainly made of aluminum. One group of the metal members to be joined together may be of Al and the others of a material selected from Al, Cu, Ti and Fe. At least one group of the metal members to be joined together is formed by brazing sheets clad with a brazing material.

The flux used for brazing these metal member is a corrosion-resistant fluoride flux containing a metal component, which can form a corrosion-inhibiting metal film. This fluoride flux is preferably a flux containing a metal which is a base with respect to the metals of the members, such as the fins and tubes. When a flux containing $ZnF_2$ is used to braze the members, such as fins and tubes of Al, the $ZnF_2$ decomposes at the brazing temperature, and the metal Zn covers the brazed portions or the whole surface of the heat exchanger, so that the boring corrosion-resistance of the Al can be improved. The Zn is a base with respect to Al and corroded sacrificially in a corrosive environment. This enables a protection of the Al from corrosion. $SnF_2$ has the same effect as $ZnF_2$.

Among $ZnF_2$-containing fluxes, fluxes containing $KF$—$AlF_3$—$ZnF_2$ or $KF$—$AlF_3$—$ZnF_2$—$LiF$ in particular have a high thermal efficiency and a high boring corrosion resistance.

According to the present invention, the preferable weight ratio ranges of the components KF, $AlF_3$ and $ZnF_2$ is 25–40% to 38–54% to 3–30%. Furthermore, 0.5–9% by weight of at least one material selected from LiF, NaF, MgF and CaF can be effective.

LiF, NaF, MgF and CaF can improve the wetting of the flux during the brazing to increase the brazing efficiency. However, when less than 0.5% by weight of these substances is added to the flux, the wetting of the flux is not improved sufficiently, and when more than 9% by weight of these substances is added, the melting point of the flux increases too much. The flux with a particularly preferable weight ratio range of components contains 32–36% KF, 44–50% $AlF_3$, 7–15% $ZnF_2$, and 3–6% LiF. This flux melts below 600° C. and is greatly activated at the brazing temperature. A particularly preferable quantity of compounds added instead of LiF, i.e. the NaF, MgF and CaF, is within the range of 1 to 2% by weight.

The fluoride flux of this composition is manufactured in various ways. Method of manufacturing such a flux include, for example, a method of melting a mixture of KF, AlF$_3$, ZnF$_2$ and an additional compound of a predetermined composition, cooling the melt to solidify it, and then pulverizing the resultant product. A method of mixing a product obtained by melting ZnF$_2$ and LiF, then cooling and pulverizing it; and a method of agitating KF, AlF$_3$, ZnF$_2$ and LiF in water to form a creamy mixture, and drying the mixture to obtain a powdered product, can also be employed. The fluoride flux prepared by using this mixture of raw materials, i.e. KF, AlF$_3$, ZnF$_2$ and LiF, has the following crystalline structure. A powder prepared from a molten mixture of these four materials contains compounds including K$_3$Zn$_2$F$_7$, KAlF$_4$, K$_3$AlF$_6$ and K$_2$LiAlF$_6$; a powder prepared from a mixture obtained by agitating a molten mixture of KF and AlF$_3$ and a molten mixture of ZnF$_2$ and LiF together contains compounds including KAlF$_4$, K$_3$AlF$_6$, ZnF$_2$ and LiF; and a powder prepared from a mixture obtained by agitating the four components in water to form a creamy mass, and then drying the mass, contains compounds including K$_3$AlF$_6$, K$_2$LiAlF$_6$, KZnF$_3$, ZnF$_2$, KF and AlF$_3$. These compounds have a very low hygroscopicity, and this property of the compounds acts to further improve the corrosion-resistance of the heat exchanger with respect to water.

An aqueous solution containing 6-30% by weight of a fluoride flux prepared by any of the above methods is applied over the whole surface or the joint portions of a heat exchanger which consists of fins and tubes, and the resultant heat exchanger is dried to remove the water therefrom, the heat exchanger being then brazed in an electric furnace in an atmosphere of a non-oxidizing gas, particularly N$_2$ gas, of which the dew point has been regulated to not more than −15° C. As a result, a heat exchanger which can be brazed efficiently and which has a high thermal efficiency is obtained. There is a correlation between the dew point of the brazing atmosphere and the concentration of the flux, and these values should be within a range which enable the brazing to be carried out satisfactorily. Using the flux in the form of an aqueous solution of a predetermined concentration is advantageous from various points of view, it ensures that a required quantity of sacrificial film is formed on the surface of a heat exchanger, the price of the heat exchanger can be reduced, and the heat exchanger can be braze-finished attractively. It has been ascertained that the surface of a heat exchanger thus subjected to the application of the flux including KF, AlF$_3$, ZnF$_2$ and LiF and brazing contains compounds such as K$_2$LiAlF$_6$, KAlF$_4$, Zn and ZnO.

DETAIL DESCRIPTION OF THE PREFERRED EMBODIMENTS

Figure 2:
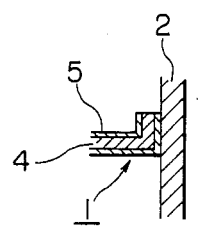
FIG. 2 is an enlarged view of part A of FIG. 1.
Figure 3:
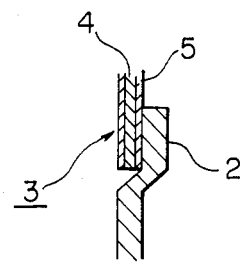
FIG. 3 is an enlarged view of part B of FIG. 1.

An example (Example 1) of a heat exchanger consisting of fins and tubes will now be described with reference to FIG. 1. Each of fins 1, which are a plurality of plate members, has holes in which tubes 2 are inserted and attached thereto. U-shaped tubes 3 for connecting the tubes together are connected to the end portions thereof. Each of the fins 1 and U-shaped tubes 3 is made of a brazing sheet which is made by coating the surface of a core material 4 composed mainly of Al with an Al—Si brazing material 5 as shown in FIGS. 2 and 3. Each Fin 1 consists of a core material of Aluminum alloy A3003 (Al—1.2%Mn) and a brazing material of Al—Si alloy A4343 (Al—6.8—8.2%Si—0.25-%Cu—0.8%Fe—0.2%Zn—0.1%Mg), and has dimensions of 40×60×0.2 mm. Each tube 2 consists of Aluminum A1050 (more than 99.5%Al) and has dimensions of 8φ×1 mm. The U-shaped tubes 3 consist of a core material of A1050 and a brazing material of A4343. Combinations of these metal members were immersed in an aqueous solution of a concentration of flux of 6-30% (weight ratio). The combinations of metal members were then dried to evaporate the water therefrom. The products thus obtained were heated to 615° C. and brazed in an electric furnace in which the dew point of N$_2$ was not more than −15° C. The flux used in this Example consisted of 37% by weight KF, 49% by weight AlF$_3$ and 14% by weight ZnF$_2$.

Figure 4:
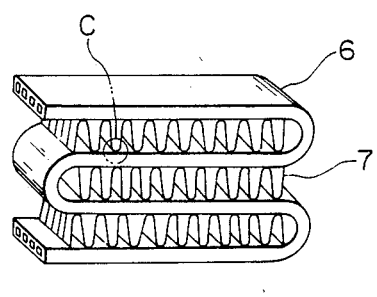
FIG. 4 is a perspective view of another embodiment of the heat exchanger according to the present invention.
Figure 5:
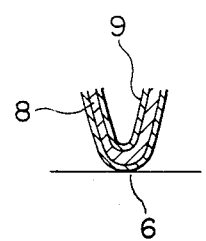
FIG. 5 is an enlarged view of part C of FIG. 4.

An example (Example 2) of another type of heat exchanger consisting of fins and tubes is shown in FIG. 4, this type of heat exchanger is called a corrugated heat exchanger. In this heat exchanger, fins 7 are provided between flat tubes 6, and they are connected to one another at contact points thereof. Each fin 7 consists of a brazing sheet which is made by coating the surface of a core material (A3003) 8 which contains Al as main component with an Al—Si brazing material (A4343) 9 as shown in FIG. 5. Each fin has dimensions of 50×0.17 mm (cross-section, fin length: 20 mm), and each flat tube 6 has dimensions of 50×4 holes×1 mm (cross-section). Combinations of these metal member arranged in three stages were immersed in an aqueous solution of a concentration of flux of 6-30% (weight ratio). The combinations of metal members were then dried to evaporate the water therefrom. The products thus obtained were heated to 615° C. and brazed in an electric furnace in which the dew point of N$_2$ was not more than −15° C. The flux used in this example consisted of 34% by weight KF, 46% by weight AlF$_3$, 14% by weight ZnF$_2$, and 6% by weight LiF.

Comparative example will now be described. Heat exchangers (Comparative Example 1) of the same shape as that of the heat exchangers of Example 1 were prepared, the fins and tubes of which being of A1050 with no film of brazing material thereon. In these heat exchangers, the tubes were connected together by brazing with chloride flux. Other heat exchangers (Comparative Example 2) of the same shape and materials (brazing sheet) of the heat exchangers of Example 1, were also prepared. The heat exchangers of this comparative Example differed from those of Example 1 in that the former was brazed in an electric furnace with flux consisting of 46% by weight KF and 54% by weight AlF$_3$.

The brazing characteristics of the heat exchangers made by brazing fins and tubes together are rated according to the properties of the fillets formed at the contact portions thereof. Corrosion test were done by the CAS test under JIS H8601 for 150 hours.

The brazing characteristics of and the formation of corroson-inhibiting region on the heat exchangers, with respect to various concentrations of flux and various gas dew points are shown in Table 1. The corrosion-inhibiting region correspond substantially to immobile portions of, for example, stainless steel, and have a film thereon which can reduce the progress of corrosion to a great extent. The determination of the brazing characteristics and the formation of corrosion-inhibiting regions was done in an aqueous solution containing 3% NaCl. Test pieces were made by cutting off parts of the heat exchangers.

TABLE 1

| Sample No. | | Concentration (wt %) of flux | Dew point (°C.) in the furnace | Brazing characteristics | Formation of corrosion-inhibiting region |
|---|---|---|---|---|---|
| Example 1 | 1 | 3 | −15 | Δ | X |
| | 2 | 6 | −15 | O | Δ |
| | 3 | 10 | −30 | O | O |
| Example 2 | 4 | 3 | −15 | Δ | X |
| | 5 | 6 | −15 | O | Δ |
| | 6 | 10 | −30 | O | O |
| Comparative Example 2 | 7 | 3 | −15 | Δ | X |
| | 8 | 10 | −30 | O | X |

Brazing characteristics:
Δ Rather poor fillet formation
O Good fillet formation
Formation of corrosion-inhibiting regions:
X Not formed
Δ Formed to some extent
O Formed satisfactory The results show that, when the flux of a concentration of 6% is used with the dew point of the gas at not more than −15° C., a heat exchanger with excellent brazing characteristics is obtained. The same substantially applies to the heat exchangers of the Comparative Example. However, no corrosion-inhibiting region which has been predicted to provide boring corrosion resistance for a heat exchanger, is formed on the heat exchangers made by the brazing method employed in the Comparative Example, even when the concentration of the flux and the dew point in the furnace are reduced. On the other hand, in both Examples 1 and 2 of the present invention, a corrosion-inhibiting region is formed when the concentration of the flux and the dew point in the furnace are 10% and −30° C., respectively. This will certainly ensure that these heat exchangers have a high boring corrosion resistance.

Figure 6:
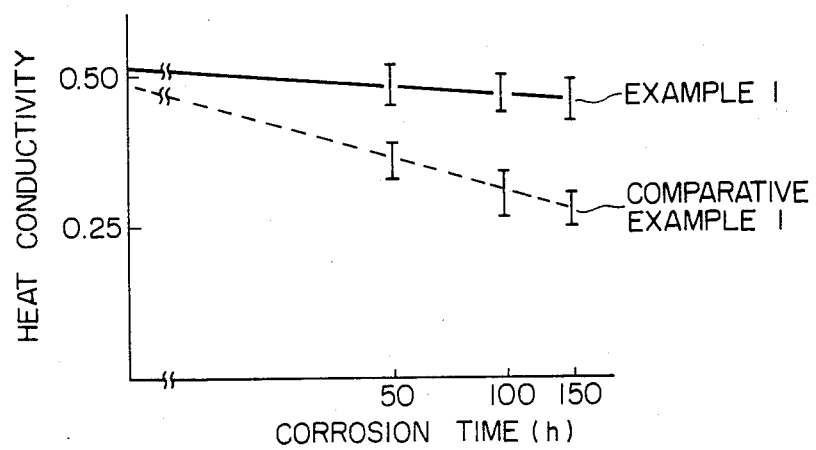
FIG. 6 is a graph of the results of comparative experiments on Example 1 of the present invention and an example of a conventional heat exchanger.

In order to estimate the thermal efficiency of each heat exchanger on the bases of the heat conductivity thereof, the heat conductivity (cal/cm$^2$/cm/sec/°C.) thereof was measured. Each sample was taken out at predetermined corrosion times (h) and fin was cut therefrom. The samples used were the heat exchanger represented by No. 3 in Table 1 and the heat exchanger of Comparative Example 1. The heat conductivity of twelve samples taken from these heat exchangers were measured. The results of the measurement are shown in FIG. 6. As is clear from FIG. 6, the heat conductivity of the heat exchanger of Comparative Example 1 is rather low at an initial stage of the corrosion thereof, and decreases gradually as corrosion time progresses. In contrast to the thermal conductivity of heat exchanger No. 3 of Example 1 is high at an initial stage of the corrosion thereof, and varies little even as the corrosion time progress, i.e. the degree of corrosion of this heat exchanger is low. In view of this, it is clear that the heat exchanger according to the present invention has a high thermal efficiency.

The depth of the boring corrosion in the tubes which occurred during the 150h corrosion test was 0.8–1.0 mm in the heat exchanger of Comparative Example 1, and 0.7–0.9 mm in the heat exchanger corresponding to sample No. 8 of Comparative Example 2 in Table 1. On the other hand, Sample Nos. 3 and 6 of Example 1 in Table 1 were both generally corroded, but the depths of corrosion in these samples were as little as 0.1–0.3 mm. As can be understood from these results, the boring corrosion resistance of the heat exchanger according to the present invention proved to be high.

The fluoride flux-coating method employed in the examples of the present invention is carried out with the metal members immersed in an aqueous solution of the fluoride flux. This means that the heat exchanger as a whole can be brazed unitarily, and heat exchangers to be mass-produced. Besides this flux-coating method which is carried out by immersing the metal members in an aqueous solution of the flux, methods in which an aqueous solution of the flux is sprayed onto the metal members or is applied thereto with a brush can also be employed in the present invention.

Figure 1:
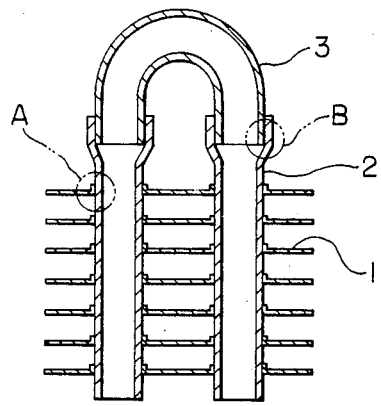
FIG. 1 is a longitudinal section of an embodiment of the heat exchanger according to the present invention.
Figure 7:
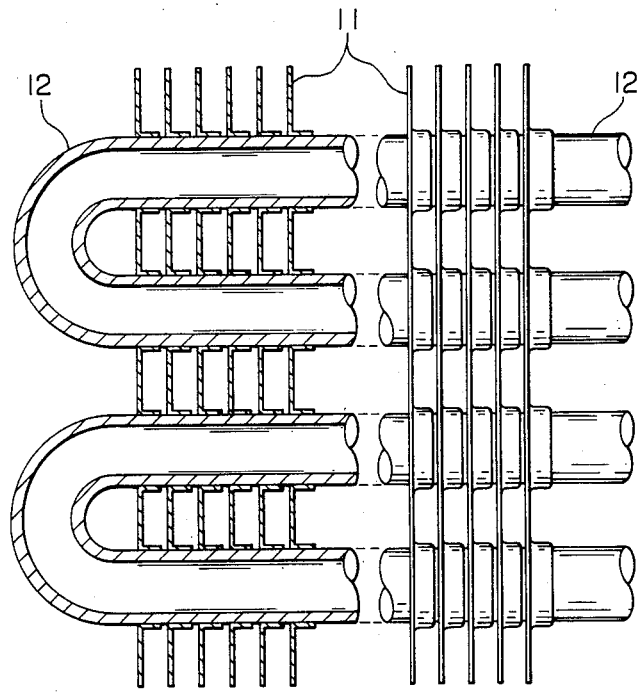
FIG. 7 is a partially sectioned, longitudinal elevation of still another embodiment of the heat exchanger according to the present invention.
Figure 8:
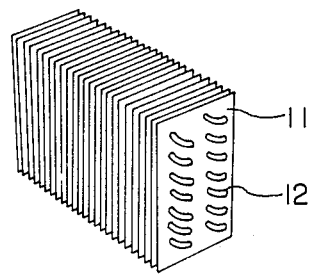
FIG. 8 is a general perspective view of the heat exchanger of FIG. 7.
Figure 9:
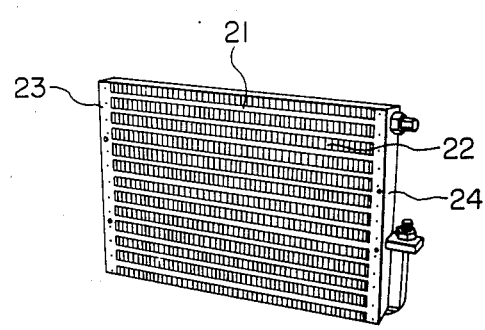
FIG. 9 is a general perspective view of further embodiment of the heat exchanger according to the present invention.

The construction of the heat exchanger according to the present invention is not limited to those shown in FIGS. 1 and 4, the present invention can also be applied to the heat exchanger whose construction is shown in FIGS. 7 and 8. In the heat exchanger shown in FIGS. 7 and 8, a plurality of U-shaped tubes 12 are inserted through a plurality of regularly-arranged rectangular plate fins 11 provided with a plurality of holes, and are attached thereto. Referring to the drawings, reference numeral 13 denotes projections for separating the plate fins 11 from one another at a predetermined distance. The present invention can also be applied to a heat exchanger whose construction is shown in FIG. 9. In this heat exchanger, fins 22 are made of thin metal plates and are provided between tubes 21. The tubes 21 are connected to end boxes 23 and 24. They are brazed to one another at contact point thereof. Gaps between the plurality of fins 22 form fluid passages.

According to the present invention described above, a heat exchanger as a whole can be brazed unitarily, and there is little possibility of the occurrence of gaps in the brazed portions thereof. A film with a corrosion-inhibiting capability is formed over the surface of the brazed portions, so that the heat exchanger has a high heat conductivity and corrosion resistance. Since no chloride flux is used in the brazing in the present invention, it is unnecessary to carry out a cleaning step after the brazing has been completed.

What is claimed is:

1. A method of manufacturing a heat exchanger by brazing metal members mainly made of aluminum or aluminum alloy comprising the following steps:
   (a) making a heat exchanger combination by assembling a plurality of brazed metal members, at least one of said brazed metal members being made of a brazing sheet clad with a brazing material;

(b) immersing said heat exchanger combination in an aqueous solution consisting essentially of 6 to 30% by weight of a fluoride flux containing Zn F$_2$ and drying said immersed heat exchanger combination to deposit the fluoride flux on brazed portions of said brazed metal members or said whole surface of said heat exchanger combination, said fluoride flux being a corrosion resistant fluoride flux which forms a corrosion inhibiting metallic film; and (c) heating said heat exchanger combination on which said fluoride flux is deposited and brazing said brazed members in a furnace in an atmosphere of a non-oxidizing gas of which the dew point of non-oxidizing gas is not more than −15° C.

2. A method of manufacturing a heat exchanger by brazing metal members mainly made of aluminum or aluminum alloy comprising the following steps:

(a) making a heat exchanger combination by assembling a plurality of brazed metal members, at least one of said brazed metal members being made of a brazing sheet clad with a brazing material;

(b) depositing a fluoride flux to brazed portions of said brazed metal members or said whole surface of said heat exchanger combination, said fluoride flux being a corrosion resistant fluoride flux which forms a corrosion-inhibiting metallic film and which consists essentially of 25–40% by weight KF, 38–54% by weight AlF$_3$, and 3–30% by weight ZnF$_2$; and (c) heating said heat exchanger combination on which said fluoride flux is deposited and brazing said brazed members in a furnace in an atmosphere of a non-oxidizing gas of which the dew point of non-oxidizing gas is not more than −15° C.

3. A method of manufacturing a heat exchanger by brazing metal members mainly made of aluminum or aluminum alloy comprising the following steps:

(a) making a heat exchanger combination by assembling a plurality of brazed metal members, at least one of said brazed metal members being made of a brazing sheet clad with a brazing material;

(b) depositing a fluoride flux to brazed portions of said brazed metal members or said whole surface of said heat exchanger combination, said fluoride flux being a corrosion resistant fluoride flux which forms a corrosion-inhibiting metallic film and which consists essentially of 25–40% by weight KF, 38–54% by weight AlF$_3$, 3–30% by weight ZnF$_2$, and 0.5–9% by weight of at least one material selected from the group consisting of Lif, NaF, MgF and CaF; and (c) heating said heat exchanger combination on which said fluoride flux is deposited and brazing said brazed members in a furnace in an atmosphere of a non-oxidizing gas of which the dew point of non-oxidizing gas is not more than −15° C.

4. The method according to claim 1, wherein said non-oxidizing gas in N$_2$.

5. The method according to claim 1 wherein the ZnF$_2$ is contained in an amount of 3–30% by weight.

6. The method according to claim 5 wherein the ZnF$_2$ is contained in an amount of from 7–15% by weight.

7. The method according to claim 3, wherein said fluoride flux consists essentially of 32–36% by weight KF, 44–50% by weight AlF$_3$, 7–15% by weight ZnF$_2$ and 3–6% by weight of Lif or 1–2% by weight of at least one material selected from the group consisting of NaF, MgF and CaF.

8. The method according to claim 3 wherein the at least one material is selected from NaF, MgF and CaF and is present in an amount within the range of 1–2% by weight.

* * * * *